United States Patent
Wysocki et al.

(10) Patent No.: US 10,264,028 B2
(45) Date of Patent: Apr. 16, 2019

(54) CENTRAL EMULATOR DEVICE AND METHOD FOR DISTRIBUTED EMULATION

(71) Applicant: Raytheon Company, Waltham, MA (US)

(72) Inventors: William Wysocki, Ellicott City, MD (US); Ryan S. Snyder, Indian Harbor Beach, FL (US); Peter C. Jensen, Columbia, MD (US)

(73) Assignee: Raytheon Company, Waltham, MA (US)

( * ) Notice: Subject to any disclaimer, the term of this patent is extended or adjusted under 35 U.S.C. 154(b) by 210 days.

(21) Appl. No.: 15/334,670

(22) Filed: Oct. 26, 2016

(65) Prior Publication Data

US 2018/0115588 A1    Apr. 26, 2018

(51) Int. Cl.
*H04L 29/06*     (2006.01)
*H04L 12/24*     (2006.01)

(52) U.S. Cl.
CPC ........ *H04L 63/205* (2013.01); *H04L 63/1416* (2013.01); *H04L 41/145* (2013.01)

(58) Field of Classification Search
CPC .............................. H04L 63/14; H04L 63/205
See application file for complete search history.

(56) References Cited

U.S. PATENT DOCUMENTS

| | | | |
|---|---|---|---|
| 7,162,715 B1 | 1/2007 | Whittaker et al. | |
| 7,240,239 B2* | 7/2007 | Suzaki | G06F 21/52 |
| | | | 714/13 |
| 8,135,657 B2* | 3/2012 | Kapoor | G06F 9/505 |
| | | | 706/45 |
| 8,670,748 B2* | 3/2014 | Slack | G06F 9/4843 |
| | | | 455/411 |
| 9,258,321 B2* | 2/2016 | Amsler | H04L 63/20 |
| 9,495,188 B1* | 11/2016 | Ettema | G06F 9/45533 |
| 9,925,468 B2* | 3/2018 | Stine | A63F 13/49 |
| 2005/0251794 A1* | 11/2005 | Taylor | G06F 11/362 |
| | | | 717/148 |
| 2006/0130016 A1* | 6/2006 | Wagner | G06F 9/4812 |
| | | | 717/136 |
| 2008/0005782 A1* | 1/2008 | Aziz | G06F 9/45537 |
| | | | 726/3 |
| 2009/0319527 A1* | 12/2009 | King | G06Q 30/06 |
| 2010/0062770 A1* | 3/2010 | Flynn | H04W 88/04 |
| | | | 455/436 |
| 2015/0143456 A1* | 5/2015 | Raleigh | H04W 12/08 |
| | | | 726/1 |
| 2016/0021141 A1* | 1/2016 | Liu | H04L 63/1433 |
| | | | 726/23 |

(Continued)

*Primary Examiner* — Ali Shayanfar
(74) *Attorney, Agent, or Firm* — Schwegman Lundberg & Woessner, P.A.

(57) ABSTRACT

Embodiments of a central emulator, distributed emulator and method for emulation of a system are generally described herein. The central emulator may receive state variables from distributed emulators at various emulation times. As an example, such an emulation time may be related to an emulation event at one of the distributed emulators. The central emulator may determine global snapshots of the system emulation for the emulation times based on the state variables. The global snapshots may be used to control a timing of the system emulation for operations such as rewinding, pausing, forwarding and/or setting to a target time.

17 Claims, 5 Drawing Sheets

(56) References Cited

U.S. PATENT DOCUMENTS

| | | | |
|---|---|---|---|
| 2016/0173447 A1* | 6/2016 | Achim | H04L 67/12 |
| | | | 726/11 |
| 2016/0219024 A1* | 7/2016 | Verzun | H04L 63/102 |
| 2016/0359878 A1* | 12/2016 | Prasad | H04L 63/1425 |
| 2017/0093910 A1* | 3/2017 | Gukal | H04L 63/1416 |
| 2017/0302685 A1* | 10/2017 | Ladnai | G06F 17/30958 |
| 2018/0324065 A1* | 11/2018 | Ritchie | H04L 43/045 |

* cited by examiner

CENTRAL EMULATOR DEVICE AND METHOD FOR DISTRIBUTED EMULATION

TECHNICAL FIELD

Some embodiments pertain to emulation of systems. Some embodiments relate to emulation on remote hosts. Some embodiments relate to synchronized emulation of devices in a system. Some embodiments relate to system security or device security. Some embodiments relate to emulation of computer networks. Some embodiments relate to emulation of mobile device networks.

BACKGROUND

A group of devices may operate in a manner that includes interaction between the devices. An emulation of the devices may be used to produce information related to system security, robustness and/or other performance related aspects. Such an emulation may become challenging, in some cases. As an example, a large number of devices may be emulated. As another example, relationships between the devices and their operation may be complex. Accordingly, there is a general need for systems and methods of emulation in these and other scenarios.

DETAILED DESCRIPTION

The following description and the drawings sufficiently illustrate specific embodiments to enable those skilled in the art to practice them. Other embodiments may incorporate structural, logical, electrical process, and other changes. Portions and features of some embodiments may be included in, or substituted for, those of other embodiments. Embodiments set forth in the claims encompass all available equivalents of those claims.

Figure 1:
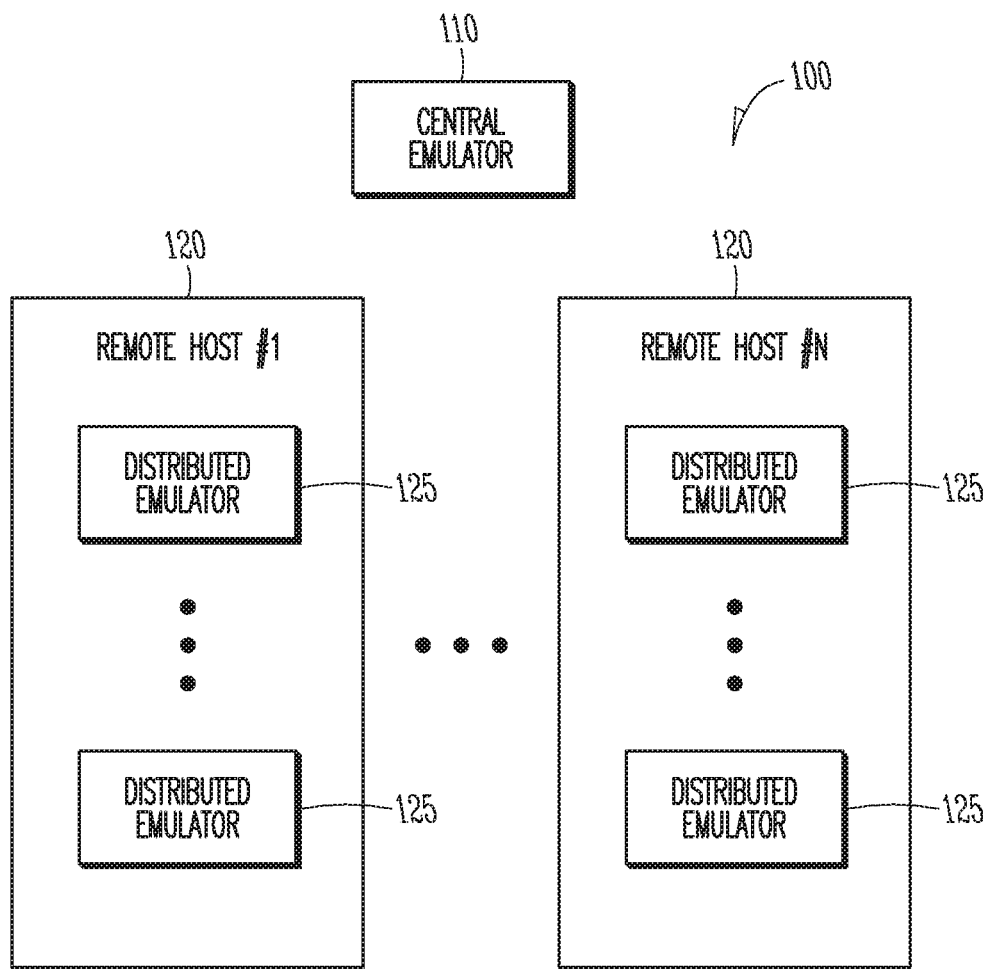
FIG. 1 illustrates an example of a system emulation in accordance with some embodiments.

FIG. 1 illustrates an example of a system emulation in accordance with some embodiments. It should be noted that embodiments are not limited to the example scenario 100 shown in FIG. 1, in terms of number, type and/or arrangement of components. Some embodiments may not necessarily include all components shown in the example scenario 100. Some embodiments may include additional components not shown in the example scenario 100. In some embodiments, one or more components may be used in place of one or more components shown in the example scenario 100 and may provide same or similar functionality to components shown in the example scenario 100.

In the example scenario 100, a system emulation may be performed by the central emulator 110 and one or more distributed emulators 125. As a non-limiting example, the distributed emulators 125 may emulate device operation by a group of devices or components of a system. In some embodiments, the central emulator 110 may perform one or more operations related to control of the system emulation, and the distributed emulators 125 may perform one or more operations for the system emulation. Such operations may be performed, in some cases, by the distributed emulators 125 at least partly under the control of the central emulator 110. As another non-limiting example, the central emulator 110 may perform one or more operations for the system emulation in addition to one or more control operations. For instance, the central emulator 110 may emulate device operation of a device in the group in addition to one or more control operations, in some cases.

In some embodiments, the central emulator 110 may be supported by a host device and/or other device, but these embodiments are not limiting. As an example, the central emulator 110 may be a stand-alone device in some cases.

In some embodiments, the distributed emulators 125 may be supported by one or more remote host devices 120. It should be noted that embodiments may include any suitable number of remote host devices 120 which may support any suitable number of distributed emulators 125. The remote host devices 120 may support a different number of distributed emulators 125 in some cases, although embodiments are not limited as such. In some embodiments, the remote host devices 120 may support a same number of distributed emulators 125. For instance, in some cases, each remote host device 120 may support a single distributed emulator 125. In addition, embodiments are not limited to usage of remote host devices 120 to support the distributed emulators 125. That is, in some embodiments, the central emulator 110 and distributed emulators 125 may be supported on a same device (such as a local host). It should also be noted, in some embodiments, some or all distributed emulators 125 may be stand-alone devices.

In some embodiments, the central emulator 110 may send emulation commands to the distributed emulators 125 as part of the system emulation. The central emulator 110 may also receive information from the distributed emulators 125, such as state variables, outputs and/or other information. It should also be noted that the remote hosts 120 may be involved in such exchanging of commands and/or information, in some cases. For instance, the emulation commands may be sent from the central emulator to a particular remote host 120 that supports one or more distributed emulators 125.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
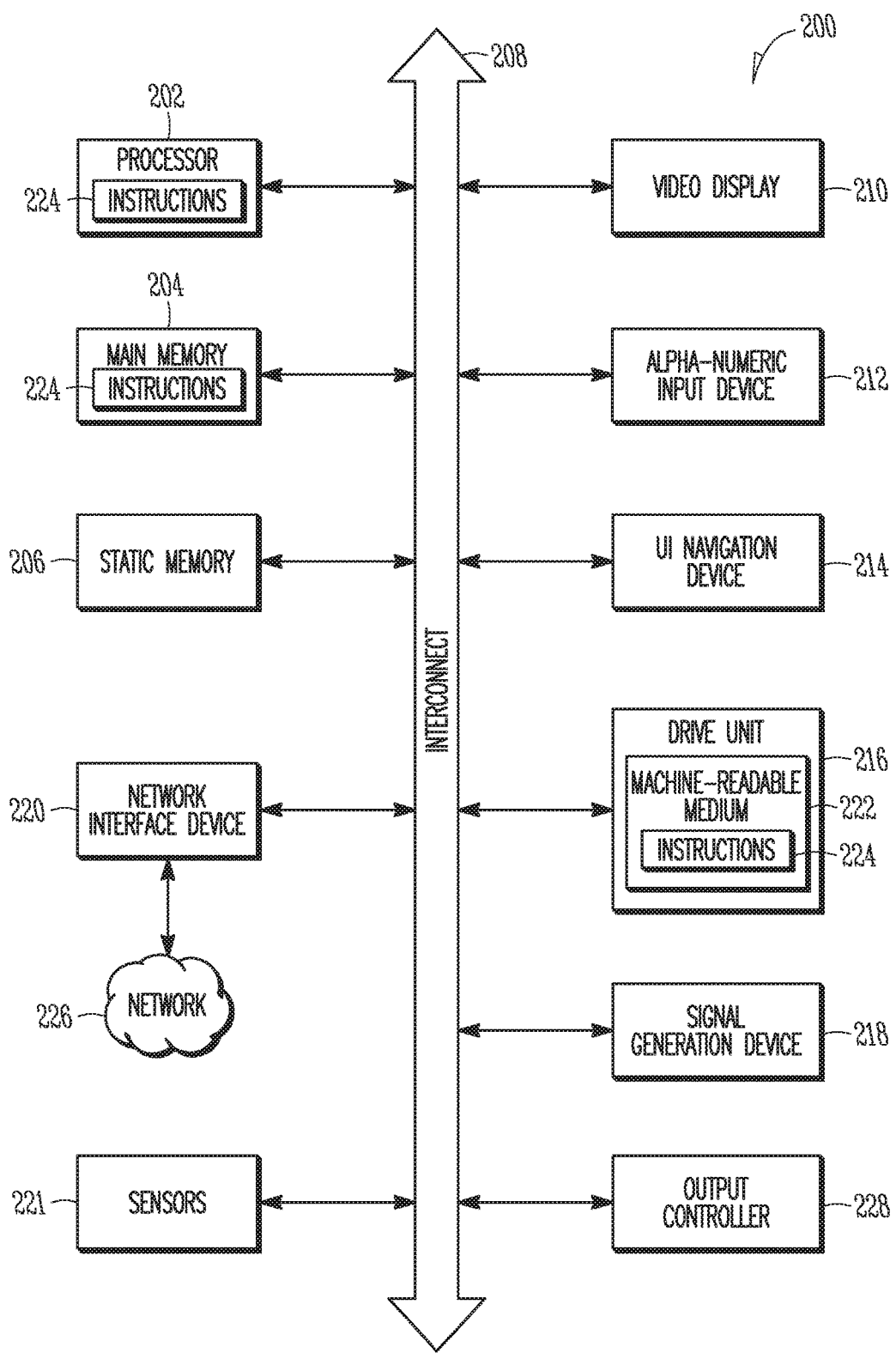
FIG. 2 illustrates a block diagram of an example machine in accordance with some embodiments.

FIG. 2 illustrates a block diagram of an example machine in accordance with some embodiments. Any one or more of the techniques (e.g., methodologies) discussed herein may be performed on such a machine 200, in some embodiments. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. In some embodiments, the machine 200 may be a mobile device, such as a User Equipment (UE) configured to operate in accordance with one or more Third Generation Partnership Project (3GPP) standards, a station (STA) configured to operate in accordance with one or more IEEE 802.11 standards and/or other mobile device. In some embodiments, the machine 200 may be a base station component, such as an Evolved Node-B (eNB) configured to operate in accordance with one or more 3GPP standards, an access point (AP) configured to operate in accordance with one or more IEEE 802.11 standards and/or other base station component. In some embodiments, the machine 200 may be a personal computer (PC), a tablet PC, a set-top box (STB), a personal digital assistant (PDA), a mobile telephone, a smart phone, a web appliance, a network muter, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media.

While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

Figure 3:
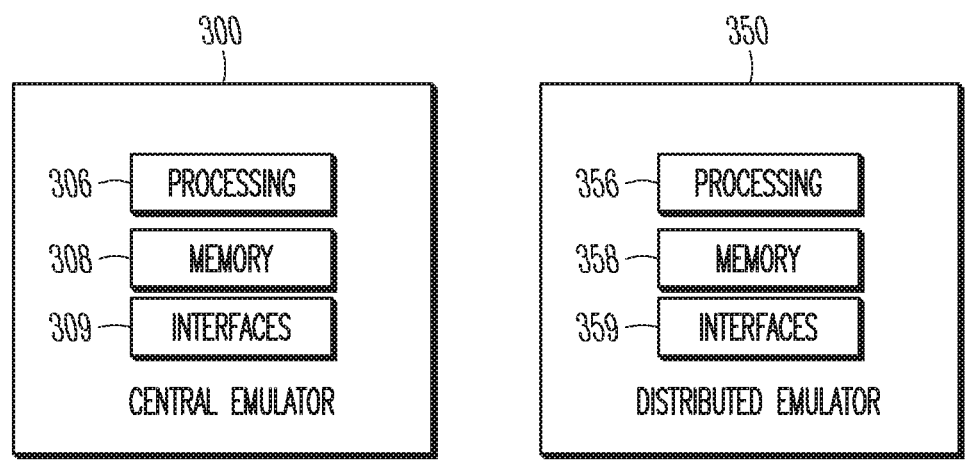
FIG. 3 illustrates a block diagram of a central emulator and a block diagram of a distributed emulator in accordance with some embodiments.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software FIG. 3 illustrates a block diagram of a central emulator and a block diagram of a distributed emulator in accordance with some embodiments. The central emulator 300 may be suitable for use as a central emulator 110 as depicted in FIG. 1 and elsewhere herein, in some embodiments. The distributed emulator 350 may be suitable for use as a central emulator 125 as depicted in FIG. 1 and elsewhere herein, in some embodiments.

The central emulator 300 may include processing circuitry 306 and memory 308 arranged to perform the operations described herein. The central emulator 300 may also include one or more interfaces 309, which may enable communication with other components, including the distributed emulators 125, remote hosts 120, other central emulators and/or other components. The interfaces 309 may be wired or wireless or a combination thereof.

The distributed emulator 350 may include processing circuitry 356 and memory 358 arranged to perform the operations described herein. The distributed emulator 350 may also include one or more interfaces 359, which may enable communication with other components, including the central emulator 110, remote hosts 120, other distributed emulators and/or other components. The interfaces 359 may be wired or wireless or a combination thereof. It should be noted that in some embodiments, the distributed emulator 350 may be supported by a remote host, such as the remote host 120 shown in FIG. 1. As a non-limiting example, the remote host 120 and the distributed emulator 350 may operate at least partly using shared resources (hardware and/or software) for processing, memory and/or interfaces, in some cases. As another non-limiting example, resources (hardware and/or software) of the remote host 120 may be used (by the remote host 120 and/or by one or more distributed emulators 350) for processing, memory and/or interfaces, in some cases.

It should be noted that in some embodiments, a central emulator may include some or all of the components shown in either FIG. 2 or FIG. 3 or both. It should also be noted that in some embodiments, a distributed emulator may include some or all of the components shown in either FIG. 2 or FIG. 3 or both. Although the central emulator 300 and the distributed emulator 350 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by a central emulator may include various components of the central emulator 300 shown in FIG. 3 and/or the example machine 200 shown in FIG. 2. Accordingly, techniques and operations described herein that refer to the central emulator 110, 300 may be applicable to an apparatus for a central emulator. In some embodiments, an apparatus for a distributed emulator may include various components of the distributed emulator 350 shown in FIG. 3 and/or the example machine 200 shown in FIG. 2. Accordingly, techniques and operations described herein that refer to the distributed emulator 125, 350 may be applicable to an apparatus for a distributed emulator.

In accordance with some embodiments, the central emulator 110 may receive state variables from distributed emulators 125 at various emulation times. As an example, such an emulation time may be related to an emulation event at one of the distributed emulators 125. The central emulator 110 may determine global snapshots of the system emulation for the emulation times based on the state variables. The global snapshots may be used to control a timing of the system emulation for operations such as rewinding, pausing, forwarding and/or setting to a target time. These embodiments will be described in more detail below.

Figure 4:
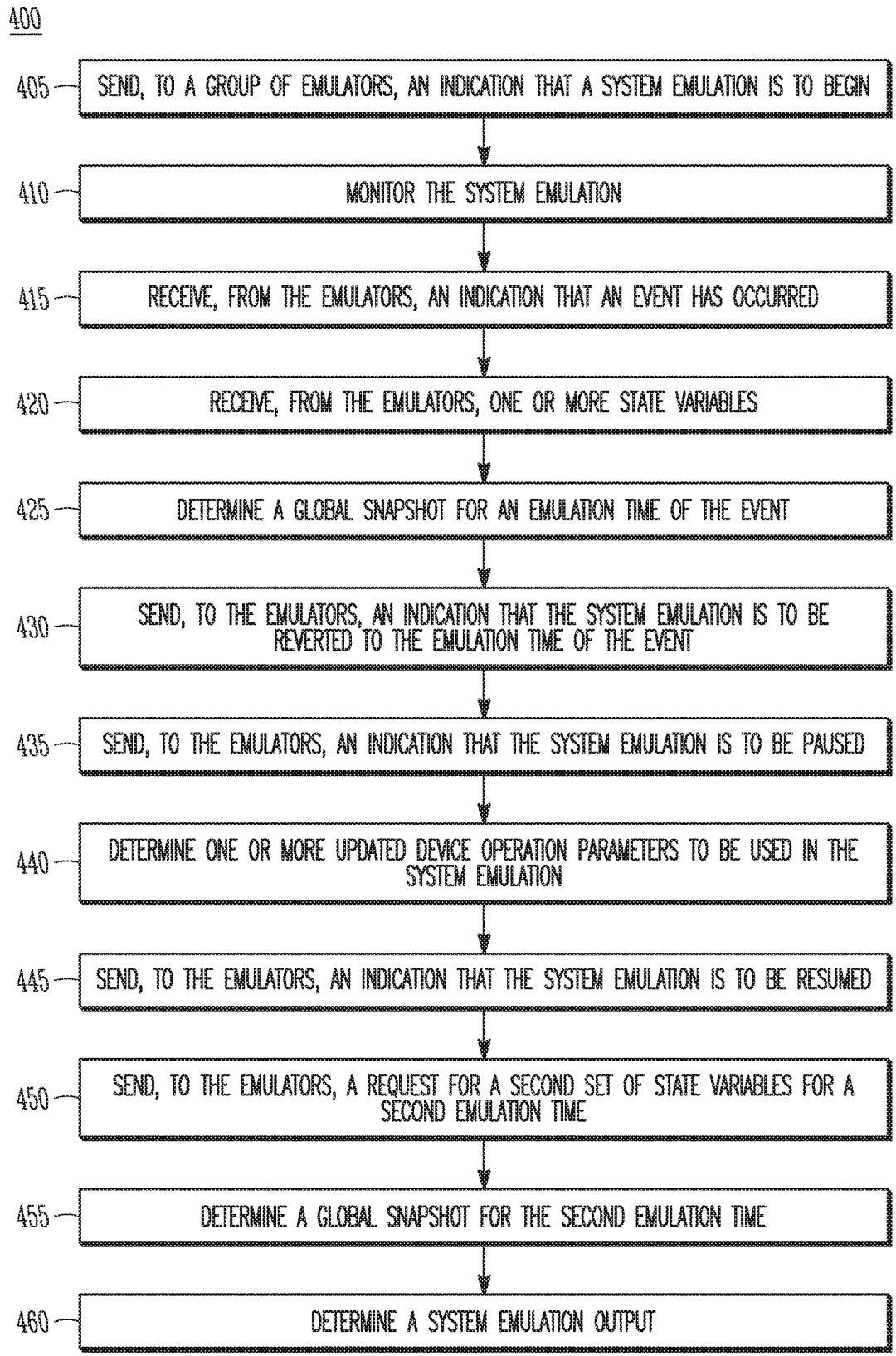
FIG. 4 illustrates the operation of a method of emulation in accordance with some embodiments.

FIG. 4 illustrates the operation of a method of emulation in accordance with some embodiments. In some embodiments, the method 400 may be performed by a central emulator 110, although embodiments are not limited as such and the method 400 may be performed by other devices and/or components in some embodiments. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5, although it is understood that the method 400 may be practiced with any other suitable systems, interfaces and components.

In addition, while the method 400 and other methods described herein may refer to central emulators 110, remote hosts 120 and/or distributed emulators 125, embodiments of those methods are not limited to just those components. Accordingly, reference to those components does not limit the scope of the embodiments. The method 400 may also be applicable to an apparatus for a central emulator 110, remote host 120, distributed emulator 125 and/or other device, in some embodiments.

In some embodiments, the method 400 may be performed in accordance with an emulation protocol. As a non-limiting example, the central emulator 110, remote hosts 120 and/or the distributed emulators 125 may be configured to operate in accordance with a KI2 Distributed System of Systems protocol.

In some embodiments, the central emulator 110 and distributed emulators 125 may exchange indicators and/or other information over any suitable interfaces, which may be wired, wireless or a combination thereof. As described previously, some or all of the distributed emulators 125 may be supported by one or more remote hosts 120 in some embodiments, in which case one or more remote hosts 120 may be involved in such exchanging of information (such as operation as a relay and/or forwarding of the information). However, embodiments are not limited to usage of distributed emulators 125 on remote hosts 120, as some or all of the emulators may be supported by a device that supports the central emulator 110, in some embodiments. Accordingly, references to distributed emulators 125 are not limiting.

In some embodiments, the system emulation may be performed to emulate device operation of a group of one or more devices. As non-limiting examples, network nodes, computers, switches, routers, mobile phones, mobile devices, base stations and/or other devices may be emulated as part of the system emulation. In some embodiments, the emulated device operation may include inter-dependency of device operation between two or more devices of the group. That is, operation of a particular device may be based at least partly on interaction of that device with other devices in the group. As an example, an emulation of a multi-node network may include emulation of operations performed by the nodes, and some of the nodes may be connected to each other. Accordingly, events that occur at a particular node may affect the operation of other nodes, such as the nodes connected to that particular node.

In an example scenario, a computer network may be emulated by the central emulator 110 and one or more distributed emulators 125. Nodes of the computer network may be emulated by the central emulator 110 and/or distributed emulators 125. Although embodiments are not limited as such, each distributed emulator 125 may emulate a network node in some embodiments. The nodes may be user terminals and/or remote terminals, in some cases. For instance, computers used by employees of a company may be networked together, and those computers may be nodes of the computer network. In this example scenario, network security may be emulated. The global snapshot of a particular node may include and/or may be based on one or more of the following parameters and/or other parameters; a user profile, which may include a user type like regular user, super-user, administrator and/or other; a list of other nodes that have accessed the particular node; a list of other nodes accessed by the particular node; a list of outside nodes/ servers that have communicated with the particular node; a number of password attempts that have been made by a user trying to access the particular node; an encryption profile, such as a type of algorithm used by the particular node; and/or other parameters. Events that may occur at the particular node (and may therefore be emulated) may include one or more of the following events and/or other events: an attempt to login to access the particular node; an attempt to change the user profile; an attempt to access data of the particular node; and/or other parameters.

In another example scenario, a mobile network may be emulated by the central emulator 110 and one or more distributed emulators 125. Mobile devices and/or base stations of the mobile network may be emulated by the central emulator 110 and/or distributed emulators 125. Although embodiments are not limited as such, each distributed emulator 125 may emulate a network node in some embodiments. For instance, a base station and one or more mobile devices registered to the base station may be emulated. The global snapshot for a particular mobile device may include and/or may be based on one or more of the following parameters and/or other parameters: a user profile, which may include a mobile phone number, network access restrictions and/or other: a list of base stations to which the mobile device has communicated; an encryption profile, such as a type of algorithm used by the particular mobile device; and/or other parameters. Events that may occur at the particular mobile device (and may therefore be emulated) may include one or more of the following events and/or other events: a phone call by the mobile device: an attempted phone call by the mobile device; an attempt to receive data by the mobile device; an attempt by an external node/ network to communicate with the mobile device (such as a phone call to the mobile device or a page): an attempt by an external node/network to request uplink data from the mobile device; and/or other parameters.

In another example scenario, an emulation system may be configured to hardware-emulate network security operations for a network of computing devices. The emulation system (such as 100 in FIG. 1) may comprise: a central controller (such as 110 in FIG. 1) and a plurality of distributed emulators (such as 125 in FIG. 1). Each distributed emulator 125 may be dedicated to emulation of the network security operations by one of the computing devices. The central controller 110 may be configured to monitor a synchronous emulation of a network security algorithm implemented on the distributed emulators 125, the synchronous emulation including random generation of security events at the distributed emulators 125. The security events may comprise at least an emulation of an attempted unauthorized access at one of the distributed emulators 125, to simulate an attempted unauthorized access at one of the computing devices. The central controller 110 may be further configured to, in response to a first security event, send a pause command to the distributed emulators 125 to pause the synchronous emulation and to instruct the distributed emulators 125 to send state variables of the distributed emulators 125 at a time of the first security event. The central controller 110 may be further configured to determine, based at least partly on the state variables at the first security event time, a first security performance level of the network security algorithm for a first group of settings of the network security algorithm at the first security event time. The central controller may be further configured to store a global snapshot of the state variables at the first security event time to enable the synchronous emulation to be reverted to the first security event time from arbitrary times subsequent to the first security event time. The central controller 110 may be further configured to, for each of multiple candidate groups of settings, revert the synchronous emulation to the first security event time by sending the global snapshot of the first security event time to the distributed emulators 125; instruct the distributed emulators 125 to resume the synchronous emulation in accordance with the candidate group of settings from the first security event time until a time of another security event; and determine, for comparison to the first security performance level, a security performance level of the network security algorithm for the candidate group of settings at the time of the other security event. The central controller 110 may be further configured to store security performance levels determined at different security event times and for different groups of settings of the network security algorithm at the different event times. The security performance levels and the groups of settings may be stored for usage in an offline determination, by a user, of a target group of settings for an implementation of the network security algorithm.

The central controller 110 may be configurable to update the group of settings of the network security algorithm based on user input or based on an automated selection, by the central controller 110, from a candidate group. The settings of the network security algorithm may comprise at least an encryption algorithm type or an encryption key size. The global snapshot for the event time may include the first group of settings. The central controller 110 may be further configured to determine multiple global snapshots at different event times or emulation times based at least partly on state variables of the computing devices received from the distributed emulators 125; switch the synchronous emulation between different event times or emulation times in accordance with the global snapshots; and modify or retain settings of the network security algorithm when the synchronous emulation is switched between the different event times or emulation times. The synchronous emulation may be performed in accordance with a reference timing of the central controller 110. The event time may be based at least partly on the reference timing. The central controller 110 may be further configured to send, to the distributed emulators 125: an indicator that the synchronous emulation is to revert from the event time to a prior emulation time, and a prior global snapshot for the prior emulation time. The central controller 110 may also send one or more emulation commands to the distributed emulators 125 to rewind, revert, advance, and/or otherwise set the emulation to a particular time. As part of the setting of the emulation to the particular time, a global snapshot of the particular time may also be sent to the distributed emulators 125.

It should also be noted that embodiments are not limited by references herein (such as in descriptions of the methods 400, 500 and/or other descriptions herein) to transmission, reception, sending and/or exchanging of elements such as frames, messages, requests, indicators, signals or other elements. In some embodiments, such an element may be generated, encoded or otherwise processed by processing circuitry (such as by a baseband processor included in the processing circuitry) for transmission and/or sending. The transmission and/or sending may be performed by a transceiver, interface circuitry and/or other component, in some cases. In some embodiments, such an element may be decoded, detected or otherwise processed by the processing circuitry (such as by the baseband processor). The element may be received by a transceiver, interface circuitry and/or other component, in some cases. In some embodiments, the processing circuitry and/or transceiver and/or interface circuitry may be included in a same device. The scope of embodiments is not limited in this respect, however. The interface circuitry may be separate from the device, in some embodiments. The transceiver may be separate from the device, in some embodiments. In some embodiments, the device may include interface circuitry and may not necessarily include a transceiver.

At operation 405 of the method 400, the central emulator 110 may send, to a group of one or more distributed emulators 125, an indication that the system emulation is to begin. At operation 410, the central emulator 110 may monitor the system emulation. For instance, the central emulator 110 may monitor for events that have occurred at one or more distributed emulators 125. As another example, the central emulator may monitor inputs and/or outputs for one or more distributed emulators 125.

At operation 415, the central emulator 110 may receive an indication that an event has occurred at one or more distributed emulators 125. For instance, a message may be sent from a distributed emulator 125 to the central emulator 110 to indicate the occurrence of the event. Embodiments are not limited as such, however, as the central emulator 110 may determine occurrences of events at the distributed emulators 125 using other techniques, in some cases.

In some embodiments, the event may be based at least partly on device operation of one or more of the devices being emulated by the system emulation. As non-limiting examples, such events may be based (at least partly) on a randomly generated input to a distributed emulator 125, a randomly generated input to the central emulator 110, an output from a distributed emulator 125, an output from the central emulator 110, user input to a distributed emulator 125, user input to the central emulator 110 and/or other occurrences. As a non-limiting example, in an emulation of a computer network, an emulated event may include a user request for a web-page. As another non-limiting example, an output value may fall in a certain range, such as a range above a pre-defined threshold.

At operation 420, the central emulator 110 may receive, from one or more of the distributed emulators 125, one or more state variables. The state variables may be received at any suitable time. As an example, a distributed emulator 125 may send one or more state variables to the central emulator 110 when an event occurs at the distributed emulator 125. As another example, the state variables may be sent when the distributed emulator 125 is made aware (by the central emulator 110 or otherwise) that an event has occurred at another distributed emulator 125.

In some embodiments, such state variables may be related to operation of one or more of the devices emulated by the system operation. Non-limiting examples of state variables may include, but are not limited to, parameter values, indexes, counts, input values, output values and/or other values related to device operation. As a non-limiting example, a computer terminal that accepts user input may operate in a state of "waiting for user input" or similar. As another non-limiting example, a count of a number of password attempts at the computer terminal may be used. Although embodiments are not limited as such, a set of state variables for a distributed emulator 125 at a particular emulation time may be included in an "emulator snapshot" for the distributed emulator 125 for the emulation time.

In some embodiments, the system emulation may be performed in accordance with a reference timing of the central emulator 110 to enable a synchronized emulation, by the group of distributed emulators 125, of the device operation of the group. Accordingly, times of the emulation may be given in terms of the reference time and/or with respect to the reference time. For instance, the reference time may define a "zero time" reference for the system emulation. As an example, an emulation time of the event may be a time at which the event occurs with respect to the reference time. As another example (which will be described in more detail below), the system emulation may be set, by the central controller 110, to a target emulation time that may be given in terms of the reference time.

At operation 425, the central emulator 110 may determine a global snapshot for an emulation time of the event based at least partly on one or more state variables of the distributed emulators 125 at the emulation time. In some embodiments, state variables of a distributed emulator 125 may be included as part of an emulator snapshot for the emulation time of the event. Accordingly, the global snapshot may describe a state of the system at the emulation time of the event. In some embodiments, the global snapshot may be based on the state variables (and/or emulator snapshots) of the distributed emulators 125 at the emulation time of the event. As an example, the global snapshot may include values of the state variables of the distributed emulators 125 at the emulation time of the event. As another example, the global snapshot may also be based on an inter-dependency of the device operation between two or more devices of the group.

In some embodiments, the global snapshot may be determined at least partly to enable a capability of the central emulator 110 to control an emulation time of the event. As an example, the central emulator 110 may send an indication to the distributed emulators 125 that the system emulation is to be set according to a target emulation time. A corresponding global snapshot for the target emulation time may indicate, to the distributed emulators 125, state variables for the target emulation time. Accordingly, the global snapshot may enable the distributed emulators 125 to set and/or reset state variables to appropriate values (at which they may have been set at the target emulation time) according to information included in the global snapshot.

As an example, the target emulation time may occur before a current emulation time of the system emulation, in which case the global snapshot for the target emulation time may be sent to the distributed emulators 125 as part of a rewinding of the system emulation to the target emulation time. As another example, the target emulation time may occur after a current emulation time of the system emulation (such as when the current emulation time has been reverted to a previous time) in which case the global snapshot for the target emulation time may be sent to the distributed emulators 125 as part of an advancing and/or forwarding of the system emulation to the target emulation time.

As another example, at operation 430, the central emulator 110 may send, to the distributed emulators 125, an indication that the system emulation is to be reverted to the emulation time of the event from a current emulation time. In addition, the global snapshot for the emulation time of the event may also be sent to the distributed emulators 125. Accordingly, a distributed emulator 125 may determine, from the received global snapshot, appropriate values to which it should set its state variables in order to enable the system emulation to be reverted to the emulation time of the event. In some embodiments, the central emulator 110 may revert the system emulation back to a prior emulation time for which a global snapshot is available using similar techniques (such as sending of a global snapshot for the prior emulation time to the distributed emulators 125).

In some embodiments, the determination and usage of global snapshots may enable the central emulator 110 to perform operations to cause the system emulation to pause, rewind, move forward, revert to a previous time, forward to a subsequent time and/or other operations. Such operations may be performed in accordance with global snapshots of the system emulation at corresponding emulation times. The central emulator 110 may store global snapshots for a set of emulation times in order to enable these and other operations, in some cases. As an example, the system emulation may be moved forward and/or backward between any two emulation times for which global snapshots are available, in some embodiments.

As another example, at operation 435, the central emulator 110 may send, to the distributed emulators 125, an indication that the system emulation is to be paused and/or suspended. At operation 440, the central emulator 110 may determine one or more updated device operation parameters to be used in the system emulation. As a non-limiting example, the determination of the updated device operation parameters may be based at least partly on an output from one or more distributed emulators 125 while the system emulation is paused. At operation 445, the central emulator 110 may send, to the distributed emulators 125, an indication that the system emulation is to be resumed. In some embodiments, the central emulator 110 may also send, to the distributed emulators 125, one or more updated device operation parameters to be used as part of the system emulation when it is resumed. That is, the system emulation, when resumed, may operate in accordance with the updated device operation parameters. It should be noted that similar techniques may be performed, in some embodiments, for a global snapshot. For instance, a global snapshot of the system emulation taken while the system is paused may be modified, by the central emulator 110, and sent to the distributed emulators 125 for usage when the system emulation is resumed.

It should be noted that in some embodiments, the performance of operations such as those in 435-445 may enable the system emulation to be paused, operation parameters to be modified based on processing and/or computations at the central emulator 110, and the system emulation to be resumed based on the modified operation parameters.

At operation 450, the central emulator 110 may send, to the distributed emulators 125, a request for state variables (and/or emulator snapshots) for a particular emulation time. In some cases, the central emulator 110 may poll the distributed emulators 125 for the state variables at the particular emulation time. At operation 455, the central emulator 110 may determine a global snapshot for the particular emulation time, based at least partly on state variables of the distributed emulators 125 at the particular emulation time. In some embodiments, the particular emulation time for which the state variables are requested may be selected, by the central emulator 110, for reasons that may or may not be related to occurrences of events. Accordingly, the central emulator 110 may determine and/or store global snapshots of the system emulation at various times.

As an example, the request may indicate multiple emulation times for which state variables are to be sent to the central emulator 110. As another example, the request may indicate a schedule for sending of state variables by the distributed emulators 125 to the central emulator 110. For instance, a periodic interval for the sending may be indicated. As another example, multiple such requests may be sent by the central emulator 110.

At operation 460, the central emulator 110 may determine an output of the system emulation. As an example, a determination of whether a system of devices operates securely and/or a level of security may be determined. As another example, a fault tolerance of the system of devices may be determined. As another example, an ability or inability of the system to respond to events may be determined. These examples are not limiting, however, as other suitable outputs may be determined and may depend on the particular devices and/or operation being emulated.

In some cases, when multiple discrete devices combine to provide services, as in the case of a smart phone, debugging functionality (such as pausing and/or other) of an emulation may break a synchronization between devices being emulated and may indicate behavior that is not normally performed by one or more of the devices. In some embodiments, a system emulation (such as a KI2 Distributed System of Systems or other) may replace an underlying transport layer between interacting devices and may track their interaction across a system. While tracking events, the system emulation may create snapshots for member systems and/or devices. For instance, when any member system and/or device interacts with the system emulation by sending data into the system emulation. The system emulation may provide synchronized control for member systems, devices and/or virtual machines of the system. The system emulation may also enable global snapshots to be determined, saved and/or loaded. Accordingly, multiple emulated machines may be run in synchronization with each other in a manner in which the machines may be paused and may state connections between the machines may be maintained. The emulated machines may be located across a number of distinct physical hosts, in some embodiments. Accordingly, the system emulation may emulate a number of devices that may be higher than a number supportable by a single host, in some cases. As such, debugging of large and complicated systems may be enabled. In some cases, a change on one device being emulated may impact other devices and/or the system as a whole. In some embodiments, techniques described herein may enable synchronized control of multiple systems, saving and loading of multiple synchronized systems, communication and synchronization of guests located on remote hosts, rewinding and live play of systems of systems (which may enable exploration of alternatives in some cases) and/or deployment of large and complicated systems from saved states.

Figure 5:
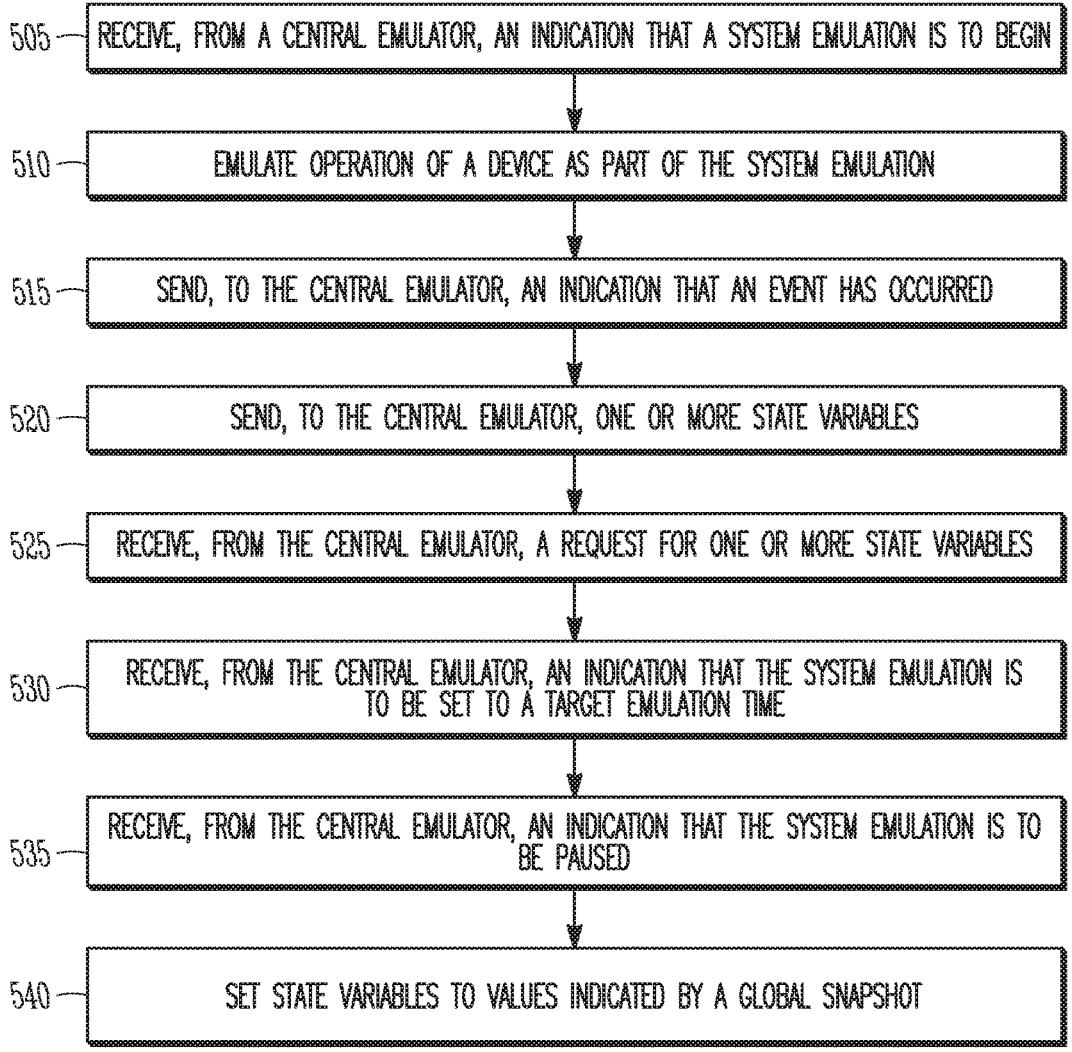
FIG. 5 illustrates the operation of another method of emulation in accordance with some embodiments.

FIG. 5 illustrates the operation of another method of emulation in accordance with some embodiments. As mentioned previously regarding the method 400, embodiments of the method 500 may include additional or even fewer operations or processes in comparison to what is illustrated in FIG. 5 and embodiments of the method 500 are not necessarily limited to the chronological order that is shown in FIG. 5. In describing the method 500, reference may be made to FIGS. 1-4, although it is understood that the method 500 may be practiced with any other suitable systems, interfaces and components. In addition, although reference may be made to central emulators 110, remote hosts 120 and/or distributed emulators 125 as part of the description of the method 500, embodiments are not limited to just those components. Accordingly, reference to those components does not limit the scope of the embodiments. The method 500 may also be applicable to an apparatus for a central emulator 110, remote host 120, distributed emulator 125 and/or other device, in some embodiments. In some embodiments, the method 500 may be performed in accordance with an emulation protocol. As a non-limiting example, the central emulator 110, remote hosts 120 and/or the distributed emulators 125 may be configured to operate in accordance with a KI2 Distributed System of Systems protocol.

It should be noted that the method 400 may be practiced at a central emulator 110, and may include exchanging of signals or messages with a distributed emulator 125. Similarly, the method 500 may be practiced at a distributed emulator 125, and may include exchanging of signals or messages with a central emulator 110. In some cases, operations and techniques described as part of the method 400 may be relevant to the method 500. In addition, embodiments of the method 500 may include operations performed at the distributed emulator 125 that are reciprocal or similar to other operations described herein performed at the central emulator 110. For instance, an operation of the method 500 may include reception of a message by the distributed emulator 125 while an operation of the method 400 may include transmission of the same message or similar message by the central emulator 110.

In addition, previous discussion of various techniques and concepts may be applicable to the method 500 in some cases, including the support of distributed emulators 125 by remote hosts 120; system emulation; events; pausing the system emulation; setting the system emulation to a target emulation time; rewinding, forwarding, advancing, and reverting the system emulation; state variables; global snapshots; emulator snapshots and/or others.

At operation 505, the distributed emulator 125 may receive, from the central emulator 110, an indication that a system emulation is to begin. At operation 510, the distributed emulator 125 may emulate operation of a device as part of the system emulation. In some embodiments, the system emulation may include emulation of device operation by a group of distributed emulators 125. In some embodiments, the system emulation may be synchronized in accordance with a reference time. In some embodiments, the system emulation may be performed under control of the central emulator 110.

At operation 515, the distributed emulator 125 may send, to the central emulator 110, an indication that an event has occurred at the distributed emulator 125. At operation 520, the distributed emulator 125 may send, to the central emulator 110, one or more state variables of the distributed emulator 125. In some cases, the state variables may be related to an emulation time of the event that has occurred at the distributed emulator 125, although embodiments are not limited as such. In some cases, the state variables may be sent according to a schedule. In some cases, the state variables may be sent in response to a request from the central emulator 110 received at operation 525. As described previously, the central emulator 110 may use the state variables as part of a determination of a global snapshot of the system emulation.

At operation 530, the distributed emulator 125 may receive, from the central emulator 110, an indication that the system emulation is to be set to a target emulation time. As described previously, the central emulator 110 may send such an indication to enable rewinding, forwarding, advancing, reverting and/or setting of an emulation time of the system emulation. At operation 535, the distributed emulator 125 may receive, from the central emulator 110, an indication that the system emulation is to be paused. At operation 540, the distributed emulator 125 may set one or more state variables based on a global snapshot and/or other information received from the central emulator 110. Such a setting may be performed while the system emulation is paused, in some cases.

In some embodiments, the distributed emulator 125 may also perform one or more other related operations. As an example, the distributed emulator 125 may send outputs and/or state variables to the central emulator 110 while the emulation is paused. As another example, the distributed emulator 125 may modify one or more state variables, inputs and/or outputs based on a command and/or indicator received from the central emulator 110. As another example, the distributed emulator 125 may resume the system emulation, which may be performed based on a command and/or indication received from the central emulator 110.

In Example 1, an emulation system may be configured to hardware-emulate network security operations for a network of computing devices. The emulation system may comprise:

a central controller and a plurality of distributed processing elements. The central controller and each of the distributed processing elements may comprise processing circuitry and memory. A portion of each distributed processing element may be configured to operate as a distributed emulator. Each portion may be dedicated to emulation of the network security operations by one of the computing devices. The central controller may be configured to monitor a synchronous emulation of a network security algorithm implemented on the distributed processing elements, the synchronous emulation including random generation of security events at the distributed processing elements. The security events may comprise at least an emulation of an attempted unauthorized access at one of the distributed processing elements, to simulate an attempted unauthorized access at one of the computing devices. The central controller may be further configured to, in response to a security event, send a pause command to the distributed processing elements to pause the synchronous emulation and to instruct the distributed processing elements to send state variables of the distributed processing elements at a time of the security event. The central controller may be further configured to determine, based at least partly on the state variables at the security event time, a security performance level of the network security algorithm for a group of settings of the network security algorithm at the security event time. The central controller may be further configured to store a global snapshot of the state variables at the security event time to enable the synchronous emulation to be reverted to the security event time from arbitrary times subsequent to the security event time for security performance evaluation of the network security algorithm.

In Example 2, the subject matter of Example 1, wherein the security event may be a first security event, the security performance level may be a first security performance level, and the group of settings at the first security event time may be a first group of settings. The central controller may be further configured to, for each of multiple candidate groups of settings, revert the synchronous emulation to the first security event time by sending the global snapshot of the first security event time to the distributed processing elements; instruct the distributed processing elements to resume the synchronous emulation in accordance with the candidate group of settings from the first security event time until a time of another security event; and determine, for comparison to the first security performance level, a security performance level of the network security algorithm for the candidate group of settings at the time of the other security event.

In Example 3, the subject matter of one or any combination of Examples 1-2, wherein the central controller may be further configured to store security performance levels determined at different security event times and for different groups of settings of the network security algorithm at the different event times. The security performance levels and the groups of settings may be stored for usage in an offline determination, by a user, of a target group of settings for an implementation of the network security algorithm.

In Example 4, the subject matter of one or any combination of Examples 1-3, wherein the central controller may be configurable to update the group of settings of the network security algorithm based on user input or based on an automated selection, by the central controller, from a candidate group.

In Example 5, the subject matter of one or any combination of Examples 1-4, wherein the settings of the network security algorithm may comprise at least an encryption algorithm type or an encryption key size.

In Example 6, the subject matter of one or any combination of Examples 1-5, wherein the central controller may be further configured to determine multiple global snapshots at different event times or emulation times based at least partly on state variables of the computing devices received from the distributed processing elements, switch the synchronous emulation between different event times or emulation times in accordance with the global snapshots; and modify or retain settings of the network security algorithm when the synchronous emulation is switched between the different event times or emulation times.

In Example 7, the subject matter of one or any combination of Examples 1-6, wherein the synchronous emulation may be performed in accordance with a reference timing of the central controller. The first security event time and the times of the other security events may be based at least partly on the reference timing.

In Example 8, the subject matter of one or any combination of Examples 1-7, wherein the central controller may be further configured to send, to the distributed processing elements: an indicator that the synchronous emulation is to revert from a current time to a prior emulation time, and a prior global snapshot for the prior emulation time.

In Example 9, a non-transitory computer-readable storage medium may store instructions for execution by one or more processors of a central controller to perform operations to control a synchronous emulation of a network by a plurality of distributed processing elements, each distributed processing element to emulate network operations of a computing device of the network. The operations may configure the one or more processors of the central controller to send a pause command to the distributed processing elements to pause the synchronous emulation at an arbitrary pause time and to instruct the distributed processing elements to send state variables of the distributed processing elements at the pause time. The operations may further configure the one or more processors of the central controller to store a global snapshot of the state variables at the pause time to enable the synchronous emulation to be reverted to the pause time from arbitrary times subsequent to the pause time. The operations may further configure the one or more processors of the central controller to, for each of multiple candidate groups of settings of a network security algorithm: instruct the distributed processing elements to resume the synchronous emulation from the pause time and in accordance with the candidate group of settings of the network security algorithm; receive, from the distributed processing elements, an indication that a security event has been emulated: determine, based at least partly on state variables of the distributed processing elements at a time of the security event, a security performance level of the network security algorithm for the candidate group of settings of the network security algorithm; and revert the synchronous emulation to the pause time by sending the global snapshot of the pause time to the distributed processing elements.

In Example 10, the subject matter of Example 9, wherein the operations may further configure the one or more processors of the central controller to store the security performance levels of the network security algorithm for the candidate groups of settings of the network security algorithm. The security performance levels and the candidate groups of settings may be stored for usage in an offline determination, by a user, of a target group of settings for an implementation of the network security algorithm.

In Example 11, the subject matter of one or any combination of Examples 9-10, wherein the central controller may be configurable to select the candidate groups of settings of the network security algorithm based on user input or based on an automated generation by the central controller.

In Example 12, the subject matter of one or any combination of Examples 9-11, wherein the security events may comprise at least an emulation of an attempted unauthorized access at one of the distributed processing elements, to simulate an attempted unauthorized access at one of the computing devices. The settings of the network security algorithm may comprise at least an encryption algorithm type or an encryption key size.

In Example 13, the subject matter of one or any combination of Examples 9-12, wherein the synchronous emulation may be performed in accordance with a reference timing of the central controller. The pause time may be based at least partly on the reference timing.

In Example 14, a method of controlling a synchronous emulation of a network of computing devices by a plurality of distributed processing elements, each distributed processing element to emulate network operations of one of the computing devices, may comprise sending a pause command to the distributed processing elements to pause the synchronous emulation at an arbitrary pause time and instructing the distributed processing elements to send state variables of the distributed processing elements at the pause time. The method may further comprise storing a global snapshot of the state variables at the pause time to enable the synchronous emulation to be reverted to the pause time from arbitrary times subsequent to the pause time. The method may further comprise, for each of multiple candidate groups of settings of a network security algorithm: instructing the distributed processing elements to resume the synchronous emulation from the pause time and in accordance with the candidate group of settings of the network security algorithm; receiving, from the distributed processing elements, an indication that a security event has been emulated; determining, based at least partly on state variables of the distributed processing elements at a time of the security event, a security performance level of the network security algorithm for the candidate group of settings of the network security algorithm; and reverting the synchronous emulation to the pause time by sending the global snapshot of the pause time to the distributed processing elements.

In Example 15, the subject matter of Example 14, wherein the method may further comprise storing the security performance levels of the network security algorithm for the candidate groups of settings of the network security algorithm. The security performance levels and the candidate groups of settings may be stored for usage in an offline determination, by a user, of a target group of settings for an implementation of the network security algorithm.

In Example 16, a central emulator may comprise memory. The central emulator may further comprise processing circuitry. The processing circuitry may be configured to decode, from a group of emulators operating on one or more remote host devices, an indication that an event has been emulated as part of a system emulation of device operation of a group of devices. The processing circuitry may be further configured to determine a global snapshot for an emulation time of the event based on one or more state variables of the emulators at the emulation time. The processing circuitry may be further configured to encode, for transmission to the emulators: an indicator that the system emulation is to be reverted from a current emulation time to the emulation time of the event, and the global snapshot for the emulation time of the event.

In Example 17, the subject matter of Example 16, wherein the group of devices emulated may include a group of one or more mobile devices and a base station to which the mobile devices communicate as part of the device operation. The event may be in a group that includes, for at least one of the mobile devices, an attempt to initiate a phone call, an attempt by an external device to call or page the mobile device, an attempt by an external device to cause uplink data transmission by the mobile device or an attempt by the mobile device to update an encryption parameter used by the mobile device. The global snapshot may include, for at least one of the mobile devices, a mobile phone number, one or more network access restrictions, identifiers of one or more base stations to which the mobile device has communicated or a type of encryption algorithm used by the mobile device.

In Example 18, the subject matter of one or any combination of Examples 16-17, wherein the group of devices emulated may include a group of one or more computers of a computer network and the device operation includes intra-network communication and/or inter-network communication. The event may be in a group that includes, for at least one of the computers, an attempt to login to the computer by another computer of the computer network, an attempt to login to the computer by a component external to the computer network, an attempt to enter a password for a login to the computer, an attempt to change a user profile of the computer or an attempt to access data of the computer. The global snapshot may include, for at least one of the computers, a list of other computers that have accessed the computer, a list of other computers accessed by the computer, a list of components external to the computer network that have communicated with the computer, a number of password attempts that have been made by a user trying to access the computer or a type of encryption algorithm used by the computer.

In Example 19, the subject matter of one or any combination of Examples 16-18, wherein the processing circuitry may be further configured to encode, for transmission to the emulators, an indicator that the system emulation is to be paused. The processing circuitry may be further configured to determine one or more updated device operation parameters. The processing circuitry may be further configured to encode, for transmission to the emulators: the updated device operation parameters, and an indicator that the system emulation is to be resumed in accordance with the updated device operation parameters. The determination of the updated device operation parameters may be based at least partly on an output from one or more emulators of the group while the system emulation is paused.

In Example 20, the subject matter of one or any combination of Examples 16-19, wherein the processing circuitry may be further configured to encode, for transmission to the emulators: an indicator that the system emulation is to revert from the current emulation time to a prior emulation time, and a prior global snapshot that indicates a set of prior state variables of the emulators at the prior emulation time.

In Example 21, the subject matter of one or any combination of Examples 16-20, wherein the central emulator may be configured to operate in accordance with a KI2 Distributed System of Systems protocol.

In Example 22, a central emulator may comprise memory. The central emulator may further comprise processing circuitry. The processing circuitry may be configured to decode, from a group of emulators operating on one or more remote host devices, an indication that an event has been emulated as part of a system emulation of device operation of a group of devices. The processing circuitry may be further configured to determine a global snapshot for an emulation time of the event based on one or more state variables of the emulators at the emulation time. The processing circuitry may be further configured to encode, for transmission to the emulators: an indicator that the system emulation is to be reverted from a current emulation time to the emulation time of the event, and the global snapshot for the emulation time of the event.

In Example 23, the subject matter of Example 22, wherein the group of devices emulated may include a group of one or more mobile devices and a base station to which the mobile devices communicate as part of the device operation. The event may be in a group that includes, for at least one of the mobile devices, an attempt to initiate a phone call, an attempt by an external device to call or page the mobile device, an attempt by an external device to cause uplink data transmission by the mobile device or an attempt by the mobile device to update an encryption parameter used by the mobile device. The global snapshot may include, for at least one of the mobile devices, a mobile phone number, one or more network access restrictions, identifiers of one or more base stations to which the mobile device has communicated or a type of encryption algorithm used by the mobile device.

In Example 24, the subject matter of one or any combination of Examples 22-23, wherein the group of devices emulated may include a group of one or more computers of a computer network and the device operation includes intra-network communication and/or inter-network communication. The event may be in a group that includes, for at least one of the computers, an attempt to login to the computer by another computer of the computer network, an attempt to login to the computer by a component external to the computer network, an attempt to enter a password for a login to the computer, an attempt to change a user profile of the computer or an attempt to access data of the computer. The global snapshot may include, for at least one of the computers, a list of other computers that have accessed the computer, a list of other computers accessed by the computer, a list of components external to the computer network that have communicated with the computer, a number of password attempts that have been made by a user trying to access the computer or a type of encryption algorithm used by the computer.

In Example 25, the subject matter of one or any combination of Examples 22-24, wherein the processing circuitry may be further configured to encode, for transmission to the emulators, an indicator that the system emulation is to be paused. The processing circuitry may be further configured to determine one or more updated device operation parameters. The processing circuitry may be further configured to encode, for transmission to the emulators: the updated device operation parameters, and an indicator that the system emulation is to be resumed in accordance with the updated device operation parameters. The determination of the updated device operation parameters may be based at least partly on an output from one or more emulators of the group while the system emulation is paused.

In Example 26, the subject matter of one or any combination of Examples 22-25, wherein the processing circuitry may be further configured to decode the state variables received from the emulators. The event may be related to the device operation of one or more devices of the group. The global snapshot may be determined at least partly to enable a capability of the central emulator to revert the system emulation to the emulation time of the event.

In Example 27, the subject matter of one or any combination of Examples 22-26, wherein the system emulation may be performed in accordance with a reference timing of the central emulator to enable a synchronized emulation, by the group of emulators, of the device operation of the group. The emulation time of the event may be based at least partly on the reference timing.

In Example 28, the subject matter of one or any combination of Examples 22-27, wherein the processing circuitry may be further configured to encode, for transmission to the emulators: an indicator that the system emulation is to revert from the current emulation time to a prior emulation time, and a prior global snapshot that indicates a set of prior state variables of the emulators at the prior emulation time.

In Example 29, the subject matter of one or any combination of Examples 22-28, wherein the emulation time of the event may be a first emulation time, and the state variables of the emulators at the emulation time of the event may be included in a first set of state variables. The processing circuitry may be further configured to encode, for transmission to the emulators, a request for a second set of state variables for a second emulation time. The processing circuitry may be further configured to determine a second global snapshot for the second emulation time. The second emulation time may be exclusive to event occurrences at the emulators.

In Example 30, the subject matter of one or any combination of Examples 22-29, wherein the central emulator may operate as part of an emulator of a network. The devices emulated by the emulators may include nodes of the network. The emulated event may be based at least partly on an emulated user input at one of the nodes of the network.

In Example 31, the subject matter of one or any combination of Examples 22-30, wherein the global snapshot may be further based on an inter-dependency of the device operation between two or more devices of the group.

In Example 32, the subject matter of one or any combination of Examples 22-31, wherein the emulated event may be based at least partly on a randomly generated input to at least one of the emulators of the group.

In Example 33, the subject matter of one or any combination of Examples 22-32, wherein the central emulator may be configured to operate in accordance with a KI2 Distributed System of Systems protocol.

In Example 34, the subject matter of one or any combination of Examples 22-33, wherein the central emulator may further comprise interface circuitry configured to: receive the indication that the event has been emulated; and transmit the indicator that the system emulation is to be reverted and the global snapshot.

In Example 35, a method of emulation at a central emulator may comprise determining occurrences, at a group of distributed emulators, of emulation events of a system emulation. The method may further comprise determining global snapshots for emulation times of the emulation events, the global snapshots based at least partly on state variables of the distributed emulators at the emulation times. The method may further comprise sending, to the distributed emulators, a global snapshot for a target emulation time to which the system emulation is to be set. The system emulation may include an emulation, by the distributed emulators and under control of the central emulator, of device operation of a group of devices.

In Example 36, the subject matter of Example 35, wherein the device operation of the group of devices may include inter-dependent operation by at least a portion of the devices in the group. The global snapshots may be determined to enable a capability of the central emulator to set the system emulation to the target emulation time.

In Example 37, the subject matter of one or any combination of Examples 35-36, wherein the target emulation time may occur before a current emulation time of the system emulation. The global snapshot for the target emulation time may be sent to the distributed emulators as part of a rewinding of the system emulation to the target emulation time.

In Example 38, the subject matter of one or any combination of Examples 35-37, wherein the method may further comprise sending, to the distributed emulators, an indicator that the system emulation is to be paused at a current time. The method may further comprise determining a global snapshot for the current time based at least partly on state variables of the distributed emulators at the current time. The method may further comprise determining an updated set of device operation parameters based at least partly on the global snapshot for the current time. The method may further comprise sending, to the distributed emulators, the updated set of device operation parameters and an indicator that the system emulation is to resume in accordance with the updated set of device operation parameters.

In Example 39, the subject matter of one or any combination of Examples 35-38, wherein the system emulation may be performed in accordance with a reference timing of the central emulator to enable a synchronized emulation, by the distributed emulators, of the device operation of the group. The emulation times of the events may be based at least partly on the reference timing. The global snapshot may be sent over interface circuitry to one or more remote hosts that support operation of the distributed emulators.

In Example 40, the subject matter of one or any combination of Examples 35-39, wherein at least one of the emulated events is based on a randomly generated input to one of the distributed emulators or a user input to one of the distributed emulators.

In Example 41, a non-transitory computer-readable storage medium may store instructions for execution by one or more processors to perform operations for communication by a central emulator. The operations may configure the one or more processors to decode, from a group of emulators operating on one or more remote host devices, an indication that an event has been emulated as part of a system emulation of device operation of a group of devices. The operations may further configure the one or more processors to determine a global snapshot for an emulation time of the event based on one or more state variables of the emulators at the emulation time. The operations may further configure the one or more processors to encode, for transmission to the emulators: an indicator that the system emulation is to be reverted from a current emulation time to the emulation time of the event, and the global snapshot for the emulation time of the event.

In Example 42, the subject matter of Example 41, wherein the event may be related to device operation of at least a portion of the group of devices. The global snapshot may be determined at least partly to enable a capability of the central emulator to revert the system emulation from the current emulation time to the emulation time of the event.

In Example 43, a distributed emulator may comprise memory. The distributed emulator may further comprise processing circuitry. The processing circuitry may be configured to decode, from a central emulator, emulation commands for a system emulation that includes a device emulation, by the distributed emulator, of operation of a device. The processing circuitry may be further configured to decode, from the central emulator: an indicator that a current emulation time of the device emulation is to be reverted to a target emulation time, and a global snapshot of the system emulation for the target emulation time. The processing circuitry may be further configured to determine, based at least partly on the received global snapshot, one or more updated state variables for the distributed emulator for the target emulation time. The processing circuitry may be further configured to emulate the operation of the device in accordance with the target emulation time and the updated state variables.

In Example 44, the subject matter of Example 43, wherein the operation of the device may be based at least partly on interaction of the device with other devices in a group. The system emulation may include device emulations of other devices in the group by other distributed emulators.

In Example 45, the subject matter of one or any combination of Examples 43-44, wherein the emulation commands may be in a group that includes pausing of an emulation time of the device emulation, rewinding of the emulation time of the device emulation or forwarding of the emulation time of the device emulation.

In Example 46, the subject matter of one or any combination of Examples 43-45, wherein the hardware processing circuitry may be further configured to determine whether an event has been emulated at the distributed emulator as part of the device emulation, wherein the emulation event is based at least partly on the operation of the device. The processing circuitry may be further configured to encode, for transmission to the central emulator, one or more state variables of the distributed emulator at an emulation time of the event.

In Example 47, the subject matter of one or any combination of Examples 43-46, wherein the emulated event may be based at least partly on a randomly generated input to the distributed emulator or on a user input to the distributed emulator.

In Example 48, the subject matter of one or any combination of Examples 43-47, wherein the distributed emulator may be configured to operate in accordance with a KI2 Distributed System of Systems protocol.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An emulation system configured to hardware-emulate network security operations for a network of computing devices, the emulation system comprising: a central controller; and a plurality of distributed processing elements, the central controller and each of the distributed processing elements comprising processing circuitry and memory; the processing circuitry and the memory of each distributed processing element configured to operate as a distributed emulator, each portion dedicated to emulation of the network security operations by one of the computing devices, wherein the central controller is configured to:
monitor a synchronous emulation of a network security algorithm implemented on the distributed processing elements, the synchronous emulation including random generation of security events at the distributed processing elements, the synchronous emulation performed in accordance with a reference timing of the central controller, and the first security event time and the times of the other security events are based at least partly on the reference timing;

the security events comprising, at least an emulation of an attempted unauthorized access at one of the distributed processing elements, to simulate an attempted unauthorized access at one of the computing devices, in response to a security event, send a pause command to the distributed processing elements to pause the synchronous emulation and to instruct the distributed processing elements to send state variables of the distributed processing elements at a time of the security event;

determine, based at least partly on the state variables at the security event time, a security performance level of the network security algorithm for a group of settings of the network security algorithm at the security event time; and store a global snapshot of the state variables at the security event time to enable the synchronous emulation to be reverted to the security event time from arbitrary times subsequent to the security event time for security performance evaluation of the network security algorithm.

2. The emulation system according to claim 1, wherein:

the security event is a first security event, the security performance level is a first security performance level, and the group of settings at the first security event time is a first group of settings, and the central controller is further configured to, for each of multiple candidate groups of settings:

revert the synchronous emulation to the first security event time by sending the global snapshot of the first security event time to the distributed processing elements;

instruct the distributed processing elements to resume the synchronous emulation in accordance with the candidate group of settings from the first security event time until a time of another security event; and determine, for comparison to the first security performance level for the first group of settings, a security performance level of the network security algorithm for the candidate group of settings at the time of the other security event.

3. The emulation system according to claim 2, wherein:

the central controller is further configured to store security performance levels determined at different security event times and for different groups of settings of the network security algorithm at the different event times, and the security performance levels and the groups of settings are stored for usage in an offline determination, by a user, of a target group of settings for an implementation of the network security algorithm.

4. The emulation system according to claim 2, wherein the central controller is configurable to update the group of settings of the network security algorithm based on user input or based on an automated selection, by the central controller, from a candidate group.

5. The emulation system according to claim 2, wherein settings of the network security algorithm comprise at least an encryption algorithm type or an encryption key size.

6. The emulation system according to claim 2, the central controller further configured to:

determine multiple global snapshots at different event times or emulation times based at least partly on state variables of the computing devices received from the distributed processing elements;

switch the synchronous emulation between different event times or emulation times in accordance with the global snapshots, modify or retain settings of the network security algorithm when the synchronous emulation is switched between the different event times or emulation times.

7. The emulation system according to claim 2, the central controller further configured to send, to the distributed processing elements:

an indicator that the synchronous emulation is to revert from a current time to a prior emulation time, and a prior global snapshot for the prior emulation time.

8. A non-transitory computer-readable storage medium that stores instructions for execution by one or more processors of a central controller to perform operations to control a synchronous emulation of a network by a plurality of distributed processing elements, the synchronous emulation performed in accordance with a reference timing of the central controller, each distributed processing element to emulate network operations of a computing device of the network, the operations to configure the one or more processors of the central controller to:

send a pause command to the distributed processing elements to pause the synchronous emulation at an arbitrary pause time and to instruct the distributed processing elements to send state variables of the distributed processing elements at the pause time;

store a global snapshot of the state variables at the pause time to enable the synchronous emulation to be reverted to the pause time from arbitrary times subsequent to the pause time;

for each of multiple candidate groups of settings of a network security algorithm:

instruct the distributed processing elements to resume the synchronous emulation from the pause time and in accordance with the candidate group of settings of the network security algorithm;

receive, from the distributed processing elements, an indication that a security event has been emulated;

determine, based at least partly on state variables of the distributed processing elements at a time of the security event, a security performance level of the network security algorithm for the candidate group of settings of the network security algorithm, the time of the security event and the pause time based at least partly on the reference timing; and revert the synchronous emulation to the pause time by sending the global snapshot of the pause time to the distributed processing elements.

9. The non-transitory computer-readable storage medium according to claim 8, the operations to further configure the one or more processors of the central controller to:

store the security performance levels of the network security algorithm for the candidate groups of settings of the network security algorithm, wherein the security performance levels and the candidate groups of settings are stored for usage in an offline determination, by a user, of a target group of settings for an implementation of the network security algorithm.

10. The non-transitory computer-readable storage medium according to claim 8, wherein the central controller is configurable to select the candidate groups of settings of the network security algorithm based on user input or based on an automated generation by the central controller.

11. The non-transitory computer-readable storage medium according to claim 8, wherein:

the security events comprise at least an emulation of an attempted unauthorized access at one of the distributed processing elements, to simulate an attempted unauthorized access at one of the computing devices, and the settings of the network security algorithm comprise at least an encryption algorithm type or an encryption key size.

12. A method of controlling a synchronous emulation of a network of computing devices by a plurality of distributed processing elements, the synchronous emulation performed in accordance with a reference timing of a central controller, each distributed processing element to emulate network operations of one of the computing devices, the method comprising:

sending a pause command to the distributed processing elements to pause the synchronous emulation at an arbitrary pause time and instructing the distributed processing elements to send state variables of the distributed processing elements at the pause time;

storing a global snapshot of the state variables at the pause time to enable the synchronous emulation to be reverted to the pause time from arbitrary times subsequent to the pause time;

for each of multiple candidate groups of settings of a network security algorithm:

instructing the distributed processing elements to resume the synchronous emulation from the pause time and in accordance with the candidate group of settings of the network security algorithm;

receiving, from the distributed processing elements, an indication that a security event has been emulated;

determining, based at least partly on state variables of the distributed processing elements at a time of the security event, a security performance level of the network security algorithm for the candidate group of settings of the network security algorithm, the time of the security event and the pause time based at least partly on the reference timing;

reverting the synchronous emulation to the pause time by sending the global snapshot of the pause time to the distributed processing elements.

13. The method according to claim 12, further comprising:

storing the security performance levels of the network security algorithm for the candidate groups of settings of the network security algorithm, wherein the security performance levels and the candidate groups of settings are stored for usage in an offline determination, by a user, of a target group of settings for an implementation of the network security algorithm.

14. A central emulator, comprising: memory; and processing circuitry configured to:

decode, from a group of emulators operating on one or more remote host devices, an indication that an event has been emulated as part of a system emulation of device operation of a group of devices;

determine a global snapshot for an emulation time of the event based on one or more state variables of the emulators at the emulation time; and encode, for transmission to the emulators:

an indicator that the system emulation is to be reverted from a current emulation time to the emulation time of the event, and the global snapshot for the emulation time of the event, the group of devices emulated includes a group of one or more computers of a computer network and the device operation includes intra-network communication and/or inter-network communication, the event is in a group that includes, for at least one of the computers, an attempt to login to the computer by another computer of the computer network, an attempt to login to the computer by a component external to the computer network, an attempt to enter a password for a login to the computer, an attempt to change a user profile of the computer or an attempt to access data of the computer, and the global snapshot includes, for at least one of the computers, a list of other computers that have accessed the computer, a list of other computers accessed by the computer, a list of components external to the computer network that have communicated with the computer, a number of password attempts that have been made by a user trying to access the computer or a type of encryption algorithm used by the computer.

15. The central emulator according to claim 14, the processing circuitry further configured to:

encode, for transmission to the emulators, an indicator that the system emulation is to be paused;

determine one or more updated device operation parameters; and encode, for transmission to the emulators:

the updated device operation parameters, and an indicator that the system emulation is to he resumed in accordance with the updated device operation parameters, wherein the determination of the updated device operation parameters is based at least partly on an output from one or more emulators of the group while the system emulation is paused.

16. The central emulator according to claim 14, the processing circuitry further configured to encode, for transmission to the emulators:

an indicator that the system emulation is to revert from the current emulation time to a prior emulation time, and a prior global snapshot that indicates a set of prior state variables of the emulators at the prior emulation time.

17. The central emulator according to claim 14, wherein the central emulator configured to operate in accordance with a KI2 Distributed System of Systems protocol.

* * * * *